Dec. 20, 1949   H. E. HEISE   2,492,041
TRANSMISSION LUBRICANT RETAINER
Filed July 25, 1947   3 Sheets-Sheet 1

INVENTOR
HERMAN E. HEISE
BY
Frederic H. Miller
ATTORNEY

Dec. 20, 1949     H. E. HEISE     2,492,041
TRANSMISSION LUBRICANT RETAINER
Filed July 25, 1947     3 Sheets-Sheet 2
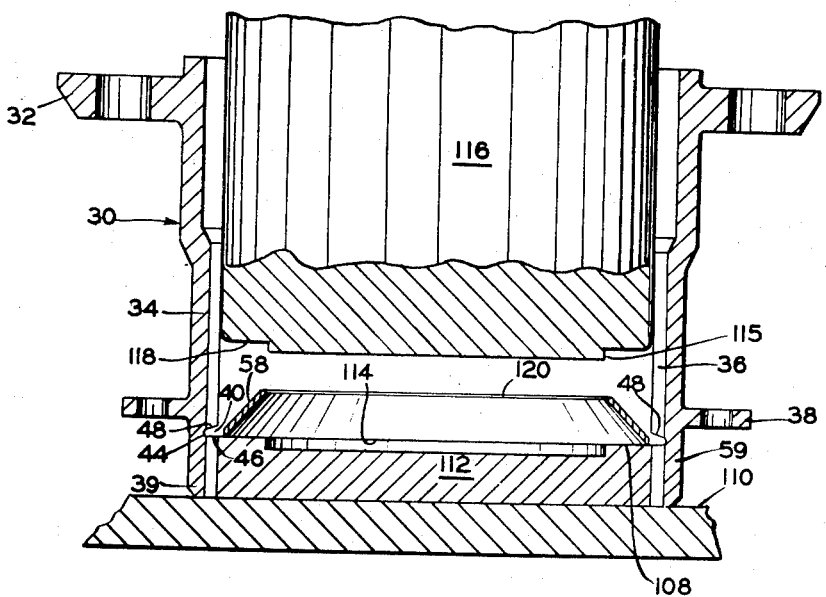
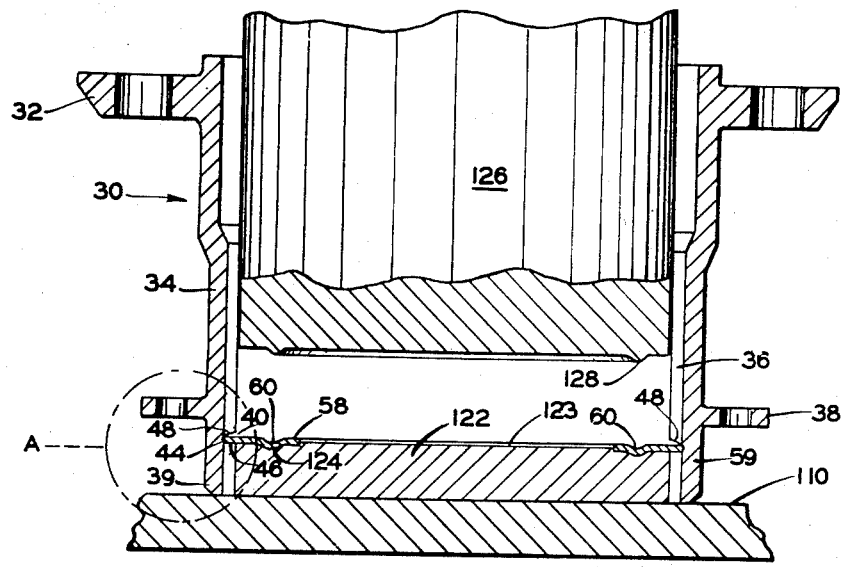
INVENTOR
HERMAN E. HEISE
BY
Frederic H Miller
ATTORNEY Dec. 20, 1949  H. E. HEISE  2,492,041
TRANSMISSION LUBRICANT RETAINER
Filed July 25, 1947  3 Sheets-Sheet 3

INVENTOR
HERMAN E. HEISE
BY Frederic H. Miller
ATTORNEY

Patented Dec. 20, 1949

2,492,041

UNITED STATES PATENT OFFICE 2,492,041

TRANSMISSION LUBRICANT RETAINER

Herman Edward Heise, West Milford, N. J., assignor to Bendix Aviation Corporation, Teterboro, N. J., a corporation of Delaware Application July 25, 1947, Serial No. 763,615

7 Claims. (Cl. 74—801)

This invention relates to transmission lubricant retainers and to a method of forming and mounting them, which provide for lubricating the gears of one or more stages of a multi-stage speed-changing gear train differently from the gears of another stage or stages.

Although of general application, a service to which the invention is particularly adapted, is in an engine starter for aircraft or other applications subject to wide variations of temperature.

In such application, it has been usual to have the several stages all in one housing or receptacle containing a relatively small single body or quantity of lubricant, common to all the stages, which is intended to be picked up by a gear or gears of each stage.

However, there is a tendency for the gears of the first or high-speed stage, by reason of velocity, to disperse the lubricant away from the first stage toward the second stage of lesser velocity, and for the latter to effect reduced dispersion toward the third stage of still lower velocity.

At temperatures rendering the lubricant highly liquid, there is not sufficient lubricant for the first stage, and, at temperatures rendering the lubricant of very low fluidity, the subsequent stage or stages are ineffectively lubricated or retarded by the lubricant, such as to preclude starting or render it difficult.

Aside from the invention hereof, about the only known way by which all of the several stages as above noted might be effectively exteriorly lubricated by one lubricant, and even then only at temperatures above the congealing temperature of the lubricant, is to entirely or substantially entirely fill the transmission housing with the lubricant, which is not feasible or practical from the standpoint of sealing and other factors.

With the housing so filled, and the lubricant congealed to nearly all of the gear surfaces and between the gear teeth, the low stages present very high resistance to starting, which would render such filling completely out of the question, when it is considered that, up to the time of the present invention, starting has been difficult at low temperatures with the smaller quantity of lubricant above noted.

Among the objects of the present invention are to overcome all of the above-mentioned and other advantages of prior devices subject thereto, and to do so by novel effective means.

Another object is to provide novel means whereby different lubricants may be employed for different gearing stages, and whereby a single lubricant may be employed, with improved results.

Another object is to provide a novel method for forming and installing the retainer or like element.

Another object is to provide means of the above-indicated character that is simple and durable in construction, economical to manufacture, and effective in its operation.

The above and other objects and features of the invention will appear more fully hereinafter from a consideration of the following description taken in connection with the accompanying drawings wherein two embodiments of the invention are illustrated by way of example.

In the drawings:

Figure 3 is a sectional diagram indicating one step of the method;

Figure 4 is a similar diagram, illustrating a final step of the method;

Figure 1:
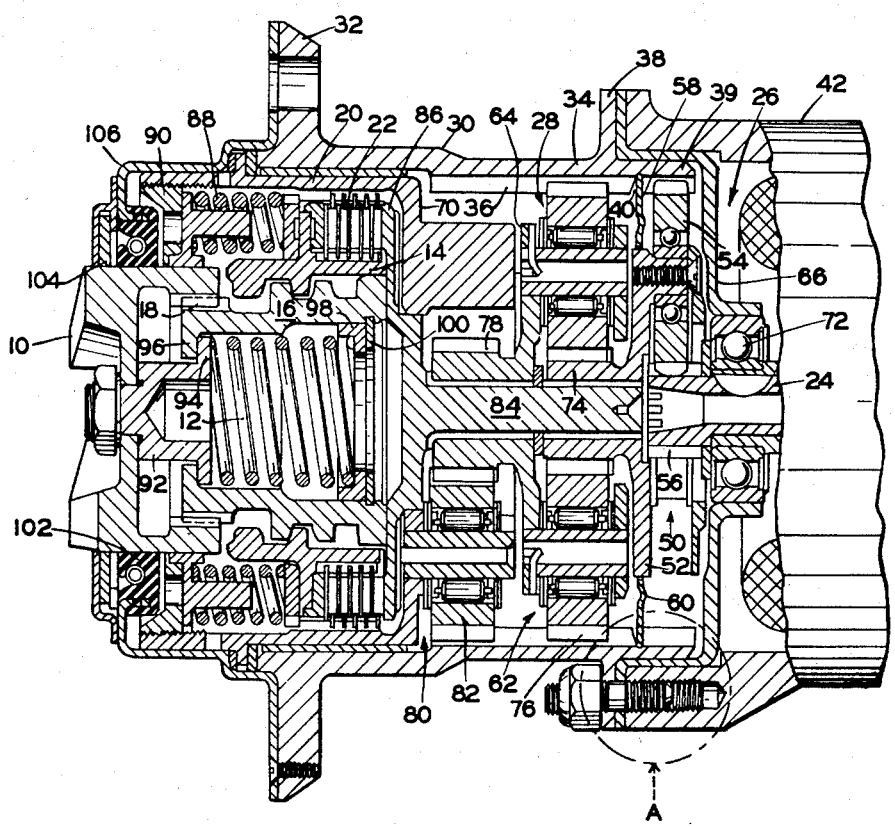
Figure 1 is a side view, partially in section and partially in elevation of an aircraft engine starter embodying the invention.

Referring to Figure 1, which shows only a portion of a starter sufficient for an understanding of the invention, the device illustrated and to which the invention is adapted comprises a jaw 10, spring means 12 behind the jaw, an axially stationary hollow nut 14, a screw shaft 16 in the nut for rotation thereby and axially movably splined, by a connection 18, to the jaw and axially movable relative to the nut 14 against the spring means 12 to cause the latter to engage the jaw to an engine jaw.

A barrel 20 around the nut 14 transmits rotation to the latter through torque limiting means in the form of a friction disc pack 22, and is connected to a shaft 24 of a motor 26 through a multi-stage gear train 28 translating the high motor speed to the lower engine starting speed of the jaw 10.

A housing 30, generally as formerly constructed, but modified in accordance with one form of the invention, has a flange 32 for attachment to an engine and adapting the housing for protrusion from the engine as a cantilever, and includes a protruding thin side wall 34 forming a stationary orbit gear 36 of the train 28.

Figure 5:
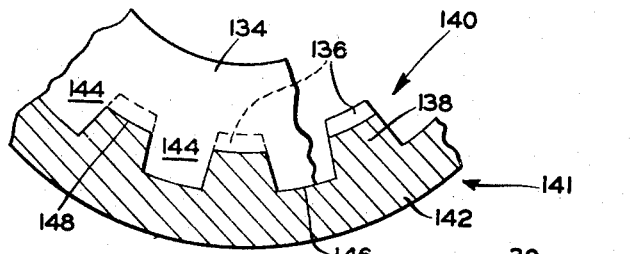
Figure 5 is a fragmentary enlarged detail of a retainer of the invention in modified form.
Figure 6:
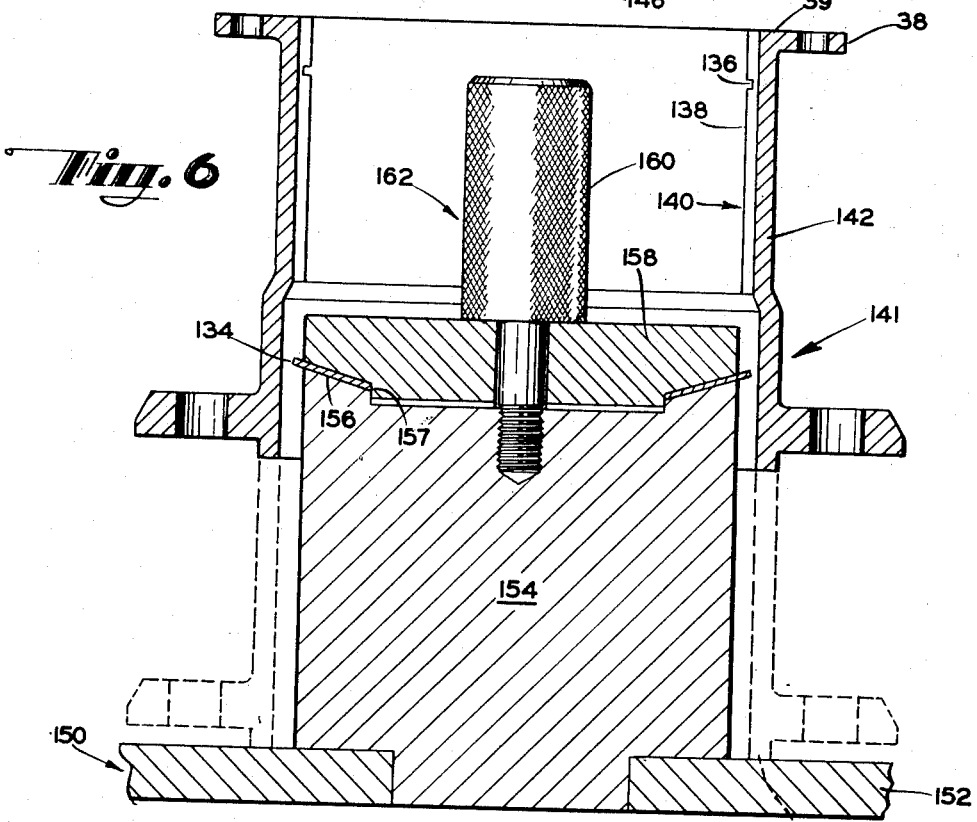
Figure 6 is a view similar to Figure 3 indicating one step in the method as associated with the retainer of Figure 5.
Figure 7:
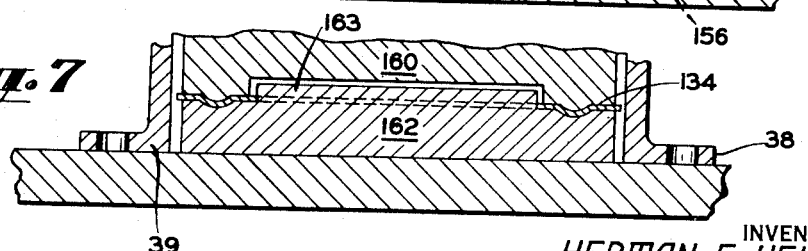
Figure 7 is a view similar to the bottom portion of Figure 4, illustrating a final step of the method of Figure 6.

A modification of the housing, in this instance, comprises the changing of the position of a motor mounting flange 38 from an outer end 39 of the housing 30 indicated in Figures 6 and 7, to the location shown in Figure 1, in which the flange 38 is outwardly, or to the right, of the engine and inwardly, or to the left, of the outer end 39 of the housing, as viewed in the drawing, to provide for an internal groove or annular series of grooves 40 between the flange 38 and the end 39 in the thin wall 34, without reducing the cantilever strength of the wall against the weight of the motor 26 and a motor housing 42 secured to the flange 38. Such strength could however, in other applications, be maintained, as by thickening the wall 34 generally or locally opposite the grooves 40, and by the form of the invention illustrated in Figures 5, 6 and 7, later pointed out.

Figure 2:
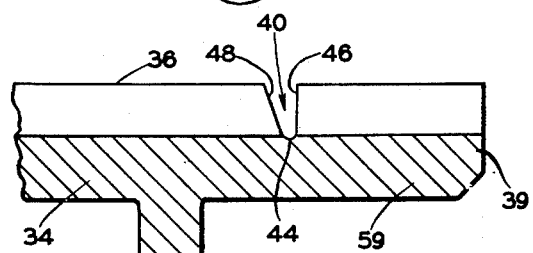
Figure 2 is an enlarged section of a fragment of a housing element of the structure showing parts as seen in broken-line circles A of Figures 1 and 4, respectively.

Each groove 40, as better seen in Figure 2 and which intersect the orbit gear teeth 36, in this instance, to substantially the root diameter thereof, is of substantially V-section having a rounded bottom 44 and radial plane and sloping sides 46 and 48, respectively, with the side 48 diverging from the bottoms 44 and the sides 46. The bottoms 44 are slightly rounded to avoid weakening the wall 34 by sharp edges, which slightly rounded section continues around the wall 34 through the teeth 36 and in the spaces between the teeth.

A first stage 50 of the train 28 includes a rotative annular member 52, radially opposite the grooves 40, carrying planet gears 54 axially outwardly, or to the right thereof as shown, engaging the orbit 36 and a pinion 56 on the motor shaft 24.

A lubricant retainer 58 which, in operative or final form is substantially flat, as shown in Figure 1, is initially formed, as shown in Figure 3, to hollow substantially frusto-conical or dished form of smaller outer diameter than the inner diameter of the teeth of the orbit 36, and constructed of sheet material, such as metal, thinner than the annular member 52, is expanded radially into and sealed against the bottoms of the grooves 40 and pressed axially to its substantially flat or plane washer shape of Figure 1, having close running tolerance relative to the member 52 thereabout. The retainer 58 is prevented from flexing in an axial direction, as by having an annular groove-forming bead 60, of gradually rounded section, between the member 52 and the orbit 36. The second stage 62 of the train 28 also has a rotative annular member 64, with respect to which and another groove in the wall 34, a retainer similar to the retainer 58 could be employed, either in addition to or in the place of the retainer shown, as by forming the housing 30 in two parts having its dividing line between the members 52 and 64 to provide for mounting the retainer means.

A partition 66 is disposed between the housing 42 of the motor 26 and the flange 38 to which the housing 42 is secured. The partition 66 forms one end closure of a main chamber having the wall 34, as its side, and a wall 70 of the barrel 28, as the other end closure of the chamber, in which all of the stages of the train 28 are disposed. The partition 66 supports a sealed anti-friction bearing 72 for the motor shaft 24, and forms one end closure of a smaller chamber for the first stage 50, the other end closure of which is formed by the rotative member 52 and the retainer 58.

Rotation of the motor shaft 24 and the pinion 56 is transmitted to the planets 54 of the first stage 50 which, since they engage the stationary orbit 36, react by rotating the member 52. The latter has a sun gear 74 engaging planets 76 on the member 64 of the second stage 62, which planets 76, since they engage the orbit 36, react by rotating the member 64. The latter carries a sun gear 78 of a third stage 80 of the train 28, which sun gear 78 engages planets 82 carried by the wall 70 and reacting with the orbit 36 to rotate the barrel 20.

A shaft 84, journaled in the sun gears 74 and 78, has a disc-like portion 86, acting as a rear stop for the screw 16 and as backing means for the discs of the pack 22, the pressure between the discs of which is regulated by a circular series of helical springs 88 adjustably held by a ring nut 90 screw threaded to the barrel 20 therein.

A mesh rod 92, secured to the jaw 10 and sealed relative thereto, has a flange 94 behind a flange 96 of the screw 16, which flange 94 is engaged by the spring 12 backed by a ring 98 held by a lock ring 100 in a groove of the screw 16. A ring seal 102, and a friction ring 104 are held by a baffle portion 106 of the starter housing around the jaw 10.

As shown, the device is a direct-cranking starter, in which the friction ring 104 restrains the jaw 10 against rotation, while the nut 14 advances the screw 16 axially to the left, to actuate the jaw through the intermediary of the spring 12 into engagement with an engine jaw, after which a shoulder on the screw engages a shoulder on the nut to rotate the jaw 10 for starting the engine. The device, of course and so far as the invention hereof is concerned, may be an inertia starter, in which the friction ring 104 is omitted, and the screw 16, instead of being screwed forwardly by the nut 14, is moved forwardly by a usual thrust or meshing rod.

Referring to Figure 3, in practicing one form of the method of forming and mounting the retainer 58, the latter is first punched from a blank flat-plane sheet, and pressed to the hollow substantially frusto-conical or dished shape shown, to have the outer edge of its large end 108 sufficiently smaller in diameter than the inner diameter of the orbit teeth 36 for slip fitting into the housing 30.

The latter is, at the time, mounted on a press bed 110, with the plane sides 46 of the grooves 40 down, and a stationary blank or press die 112 laterally substantially fitting the housing 30 adjacent to the groove, with a die top surface 114 substantially level with the plane groove side 46.

The element 58 is inserted into the housing 30, with its large end 108 on the top surface 114. A press die 116 is lowered into the housing 30, flat inner end surface 118 against the small end 120 of the element 58, to squash the element, as by a pressure, in this instance, on the order of ten tons, during which the large end 108 first spreads radially to engage the sloping surface 48 thereunder, in entering or expanding into the grooves 40 in sealed relation to the bottoms 44 and to the wall 34 between the grooves and then flattens against the top die surface 114 to assume a shape as seen in Figure 4, before a final step of Figure 4 has been effected. To ensure that the element 58 will spread outwardly, and not inwardly, the die 116 is provided with a pilot portion 115 closely fitting into the top of the element 58.

After the step of Figure 3 has been completed, the parts are rearranged, as in Figure 4, in which the die member 112 of Figure 3 is replaced by a die 122 having a rounded section annular top channel 124, and the press die 116 of Figure 3, is replaced by a die 126 having an annular ridge 128 complemental to the channel 124. The die 122 has a top portion 123 closely fitting the inner edge of the retainer, to require radially outward, and avoid radially inward, spreading of the retainer in the step of Figure 4, whereby to ensure more firmly fitting and better sealing of the retainer relative to the wall 34.

Upon pressing the die 126 against the element 58, as by a pressure, in this instance, on the order of one ton, the annular groove-forming bead 60 of Figure 1 is produced and the element thus partially formed during the process of mounting.

Another form of the method comprises the performance of all of the steps of Figures 3 and 4 with the apparatus of Figure 4, with the understanding, in the broader aspects of the invention, that the dish, frusto-conical or equivalent form of the blank 58, as seen in Figure 2, and the bead 60, or equivalent means, could be formed, as by spinning, molding or otherwise, depending upon the material employed and other factors.

In the structure as shown in Figure 1, lubricant of the same grade may, in certain instances, be employed at the bottom of the housing 30 for pick up by each of the stages, in which case that portion of the lubricant in the compartment of the first stage will be prevented from dispersal from the first stage gears by the retainer 58 and the member 52. When lubricants of different grades or temperature characteristics are employed with the first and subsequent stages, respectively, the first stage lubricant will be similarly prevented from dispersal.

As noted above, a retainer, similar to the retainer 58, may be employed with the rotatable member 64, either alone or with the retainer 58, so that, in a train of any multiple number of stages, the retainer feature may be arranged to provide for lubricating all of the stages with one lubricant or any combination of lubricants, within the number of stages which it may be desired to segregate from another stage or stages.

In the form of the invention indicated in Figures 5, 6 and 7, the construction and operation are similar to those above described, with notable exceptions, such as the form of a retainer 134 corresponding to the retainer 58, and a groove or series of grooves 136 directed annularly about, and intersecting, teeth 138 of an orbit gear 140 corresponding to the gear 36 in a housing 141 having a wall 142 corresponding to the wall 34. In this case, the grooves 136 do not extend substantially to the root diameter of the teeth 138, as the grooves 40 extend to the root diameter of the teeth 36 in the structure of Figures 1 to 4. The grooves 136 extend only a slight distance, on the order of about fifteen thousandths of an inch, into the teeth 138.

The retainer 134 is initially in the form of a substantially flat sheet-material ring including outer edge teeth 144 having crest edges 146 and trough edges 148.

In this form, the retainer 134, instead of being preformed to slightly dished or frusto-conical shape, as in the case of the retainer 58 above set forth, is merely temporarily dished incident to its insertion in the housing wall 142, as shown in Figure 6.

In Figure 6, a tool 150 comprises a base 152 having a portion 154 slidably fitting the housing 141 such that, when the latter is fitted over the portion 154, with an edge 156 resting on the base 152, the retainer 134, as held by the tool 150 is positioned substantially radially opposite the groove means 136.

Figure 6 shows the housing 141 in an intermediate stage of lowering over the tool portion 154. The portion 154 is provided with a seat 156 corresponding to a desired dish form of the retainer 134 which, when the latter is clamped against the seat 156 around a centering portion 157 by a complemental clamp member 158, reduces the diameter of the retainer 134 sufficiently to allow it to move into the wall 142. At the position of entry of the teeth 144 into the spaces between the teeth 138, it may be necessary to turn the housing 141 slightly to ensure such entry. After this step, a handle 160 of a screw 162, for clamping the retainer 134 between the portion 154 and the member 158, is in position for unclamping the retainer, upon which action, the retainer expands radially sufficiently to be temporarily held in the wall 142, while the latter is removed from the tool 150 for the next stage of assembly, as seen in Figure 7.

In the latter figure, dies 160 and 162 correspond to dies 126 and 122, respectively, and have similar operation and effect on the retainer 134. Also, a portion 163 corresponds to the portion 123 of Figure 4.

In the form of Figures 5, 6 and 7, the invention is adapted for application to standard parts, as existing prior to the invention, without requiring the flange 38 to be moved from the end 39.

Referring to Figure 5, the trough edges 148 are designed to tightly fit against the bottom of the grooves 136, with the crest edges 146 and the sides of the teeth, in slightly less tightly fitting relation to the corresponding portions of the housing 141, but sufficiently tight to constitute an effective liquid seal in accordance with the viscosity of the liquid. It is of note that the retainer is thus effectively axially locked in position by the sides of the grooves 136.

Although only two embodiments of the invention have been illustrated and described, various changes in the form and relative arrangements of the parts may be made to suit requirements.

What is claimed is:

1. The combination of a support, a housing adapted for protrusion from said support as a cantilever including a portion for mounting on the support embodying a cylindrical side wall having a flange outwardly of the support and inwardly of the outer end of the wall for mounting a second housing portion, said wall embodying an axial internal orbit gear of a multi-stage gear train and forming annular groove means between the flange and said outer end and intersecting the orbit gear teeth, said groove means being of substantially V-section with the bottom of the groove having round section slightly below the root diameter of the teeth and having a radial plane side and a sloping side, respectively, the highest speed stage of said train including a rotative annular member radially spaced inwardly and in the plane of said groove and carrying planet gears engaging the orbit gear and a pinion, and a sheet-material washer-like lubricant-retaining ring having its outer edge expanded into said groove, seated against the bottom thereof with its inner edge in close running tolerance to and about the outer axial perimeter of said member, and an annular groove-forming bead between the member and the orbit gear.

2. The combination of a housing including a multi-stage gear train having an internal orbit gear, the orbit gear having annularly directed groove means intersecting its teeth, the highest speed stage of said train including a rotative annular member radially spaced inwardly and in the plane of said groove means, and a sheet-material lubricant-retainer ring including outer-edge teeth between the teeth of the orbit gear, the crest edges of the retainer teeth in lubricant sealing relation to the housing between the orbit teeth, the trough edges of the retainer teeth in said groove means against the bottom of said groove means, the inner periphery of the retainer in close running tolerance to the outer perimeter of said member, and an annular groove-forming bead on said retainer between the member and the orbit gear.

3. The combination of a housing supporting an internal orbit gear of a multi-stage gear train, which orbit gear has annularly directed groove means intersecting its teeth, the highest speed stage of said train including a rotative annular member radially spaced inwardly and in the plane of said groove means and carrying planet gears engaging the orbit gear and a pinion, and a sheet-material washer-like lubricant retaining ring having an outer portion in said groove means, its inner edge having close running tolerance about the outer perimeter of said annular member and an annular groove-forming bead between the member and the orbit gear.

4. In a multi-stage planetary gearing having a common orbit gear for at least two succeeding stages, each stage comprising a rotative annular member carrying a plurality of planet gears in engagement with said common orbit gear, an annular cut groove through the teeth of said orbit gear in the plane of said rotative annular member, a washer-like lubricant retaining ring having a close running tolerance about the outer perimeter of said annular member and press-fitted into said groove in sealing relation to said teeth thereby impeding the flow of lubricant between said two succeeding stages.

5. In a multi-stage planetary gearing having a common orbit gear for at least two succeeding stages, each stage comprising a rotative annular member carrying a plurality of planet gears in engagement with said common orbit gear and an annular cut groove through the teeth of said orbit gear in the plane of said rotative annular member, a flat sheet-material washer-like lubricant retaining ring having a close running tolerance about the outer perimeter of said annular member and press-fitted into said groove in sealing relation to said teeth thereby impeding the flow of lubricant between said two succeeding stages, said flat lubricant retaining ring being provided with a strengthening annular groove-forming bead.

6. A multi-stage planetary gearing having integrally connected orbit gears for at least two succeeding stages comprising in combination an annular groove between said orbit gears and a substantially flat lubricant retaining ring press-fitted into said annular groove in substantial sealing relation to the teeth of said orbital gears and extending inwardly so as substantially to prevent the passage of lubricant from one of said succeeding stages to the next.

7. A multi-stage planetary gearing having interconnected orbit gears for at least two succeeding stages, comprising, in combination, an annular groove between said orbit gears between said two succeeding stages, and a substantially flat sheet-material washer-like ring provided with annular strengthening means for preventing flexing thereof in an axial direction press-fitted into said annular groove in substantial sealing relation therewith and extending inwardly to a close proximity of the higher speed stage of said two succeeding stages so as substantially to prevent the passage of lubricant from said higher speed stage to the lower speed stage.

HERMAN EDWARD HEISE.

REFERENCES CITED

The following references are of record in the file of this patent:

UNITED STATES PATENTS

| Number | Name | Date |
|---|---|---|
| 1,647,839 | Moorhouse | Nov. 1, 1927 |
| 1,925,943 | Stein | Sept. 5, 1933 |
| 2,190,254 | Caproni | Feb. 13, 1940 |
| 2,258,008 | Hollatz | Oct. 7, 1941 |
| 2,258,160 | Nardone | Oct. 7, 1941 |
| 2,329,770 | Knox | Sept. 21, 1943 |
| 2,368,133 | Galamb | Jan. 30, 1945 |
| 2,408,336 | Orr | Sept. 24, 1946 |
| 2,439,521 | Miller | Apr. 13, 1948 |